United States Patent [19]

Hollrock et al.

[11] Patent Number: 4,750,691
[45] Date of Patent: Jun. 14, 1988

[54] RETRACTABLE AIRCRAFT HOIST

[75] Inventors: Richard H. Hollrock, Simsbury, Conn.; Alvin Kagan, Coral Springs, Fla.; Scott D. Johansen, Sailsbury, Vt.

[73] Assignee: Kaman Aerospace Corporation, Bloomfield, Conn.

[21] Appl. No.: 59,007

[22] Filed: Jun. 8, 1987

[51] Int. Cl.⁴ .............................................. B64C 1/22
[52] U.S. Cl. .................................. 244/137.1; 212/187
[58] Field of Search .......................... 244/137.1, 118.1; 212/184, 187, 188; 414/540, 720; 258/1.2, 1.4, 1.6, 1.8; 52/118, 119, 116, 117

[56] References Cited

U.S. PATENT DOCUMENTS

| | | | |
|---|---|---|---|
| 1,558,636 | 10/1925 | Rutan | 212/182 |
| 3,073,457 | 1/1963 | Thomas | 212/188 |
| 3,426,915 | 2/1969 | Tesch | 212/188 |
| 3,977,531 | 8/1976 | Brewer | 212/188 |
| 4,566,659 | 1/1986 | Luckachina | 244/137.1 |

FOREIGN PATENT DOCUMENTS

| | | | |
|---|---|---|---|
| 3323513 | 1/1985 | Fed. Rep. of Germany | 244/137.1 |
| 1286829 | 8/1972 | United Kingdom | 212/187 |

Primary Examiner—Joseph F. Peters, Jr.
Assistant Examiner—Lynn M. Fiorito
Attorney, Agent, or Firm—McCormick, Paulding & Huber

[57] ABSTRACT

A hoist is provided for an aircraft, such as a helicopter or VTOL, capable of hovering flight and has a boom pivotally connected to the structural frame of the aircraft for movement between retracted and extended positions. A cable powered by a winch is engaged with the boom and is used with the extended boom for conventional hoisting operations. The arrangement of the cable guide pulleys relative to the pivot axis of the boom and the operation of the winch control system is such that the cable and winch are additionally usable to effect movement of the boom between its retracted and extended positions thereby eliminating the need for a separate boom extending and retracting motor.

9 Claims, 3 Drawing Sheets

RETRACTABLE AIRCRAFT HOIST

BACKGROUND OF THE INVENTION

The present invention relates to a hoist for a helicopter, or other aircraft capable of hovering in flight, which is for use in rescue operations, handling cargo, and the like, and deals more particularly with an improved hoist which is retractable to within the aircraft when not in use.

Hoists that are mounted on aircraft capable of hovering in flight, generally helicopters or vertical takeoff or landing aircraft (VTOLs), are known in the art, and exist in a variety of forms. The known aircraft hoists generally comprise a boom or truss extended from the side of the aircraft and a pulley located at the end of the boom and guiding a cable. The cable is driven by a hydraulically actuated winch. During a rescue mission, for example, the winch is actuated to pay out the cable over the end of the boom while the aircraft hovers over the person to be rescued. The person is held at the end of the cable and the pilot or other crew member actuates the winch to pull in the cable and carry the person toward the aircraft.

In most known hoists the boom is externally mounted from the side of the aircraft. The boom is generally located near the top of the aircraft cabin doorway so that when a person or an article is lifted it can be easily transferred from the cable extended from the end of the boom to within the cabin of the aircraft. One problem associated with known hoists having an externally mounted boom is that sometimes the aircraft's engine air intake port is located near the top of the cabin doorway and the boom then interferes with the engine inlet airflow. An additional problem associated with the externally mounted boom is that the boom adds aerodynamic drag to the aircraft, which has become of increased importance with high speed helicopters and VTOLs.

Some known hoists do include a boom retractable to within the cabin of the aircraft, however their configurations have generally proven to have various disadvantages. In one hoist of this type the hoist is mounted on a separate post extending from the floor to the cabin ceiling of the aircraft and includes a boom mounted on the post to pivot laterally about a vertical axis through the cabin doorway. In another known retractable hoist the boom is slidably supported on a railing through the cabin doorway. Both of these known retractable hoists are cumbersome because they tend to block entry into the cabin through the doorway and also because they use up valuable cabin space when retracted. A further disadvantage associated with these known retractable hoists is that they require an additional actuator to drive the boom between its retracted and deployed positions.

An object of the present invention is therefore to overcome the aforementioned problems and disadvantages encountered with known aircraft hoists.

A further object of the invention is to provide an aircraft hoist that avoids both engine inlet airflow distortion and aerodynamic drag increment during high speed flight.

Yet a further object of the invention is to provide a retractable hoist that uses less space, is easier to operate, is of less complex construction and is more reliable than known retractable hoists. In keeping with this object a more specific aim of the invention is to provide a hoist which requires only a single motor for powering both the boom extending and retracting function and the cable raising and lowering function of the hoist.

Other objects, features and advantages of the present invention will be readily apparent from the following detailed description and claims taken in conjunction with the accompanying drawings.

SUMMARY OF THE INVENTION

In accordance with the present invention a retractable hoist is provided for use on an aircraft capable of hovering in flight. The aircraft supplies a frame structure to which a boom of the hoist is pivotably connected for movement about a generally horizontal fore and aft extending pivot axis. The boom is normally received, in its retracted or undeployed condition, in a recess in the aircraft body preferably, in the case of a helicopter, located in the otherwise unused space between the bulkhead aft of the pilot's seat and the cabin doorway. The boom is rotatable relative to the frame structure between its retracted position and an extended or deployed position at which it protrudes from the side of the aircraft.

A cable is engaged with the boom and with a cable winch which pulls in and pays out the cable. A foldable strut is pivotably connected at one end to the boom and at its other end to the frame structure. The strut assumes a folded position when the boom is retracted and is carried to an unfolded position to support the boom when the boom is deployed. Gravity and an associated bungee or other spring means bias the boom toward its retracted position.

The cable is guided from the winch to and through the boom in such a way that when the cable is fixed to the outer end of the boom, as by a stop on the cable engaging the boom, pulling in of the cable by the winch moves the boom from its retracted to its deployed position, and the strut from its folded to its unfolded condition, after which the cable may be paid out and then used for normal hoisting operations. After the hoisting operations are completed, the cable is drawn in by the winch until the stop on the cable engages the outer end of the boom. At this point the operator releases a lock holding the strut in its unfolded condition, and then the winch, by slowly paying out cable, can be used to control the speed at which the boom is moved back to its retracted position under the influence of gravity and the associated spring means. Thus, the single winch serves to both extend and retract the boom and to drive the cable for normal hoisting operations.

DETAILED DESCRIPTION OF THE PREFERRED EMBODIMENT

Figure 1:
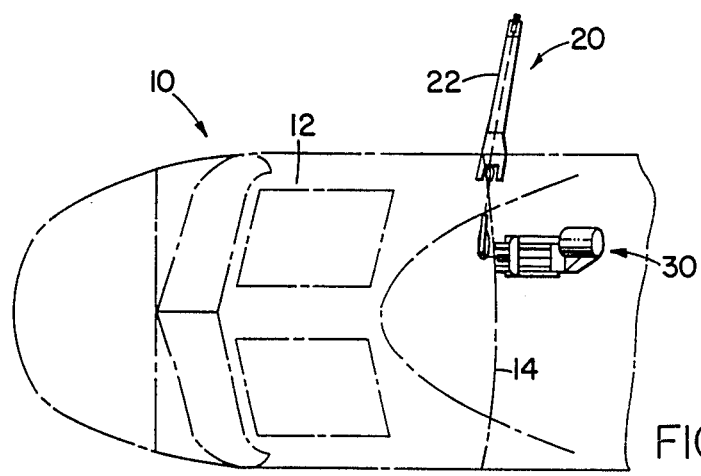
FIG. 1 is a fragmentary top view of a helicopter equipped with a retractable hoist embodying the present invention, the aircraft being shown in broken lines.
Figure 2:
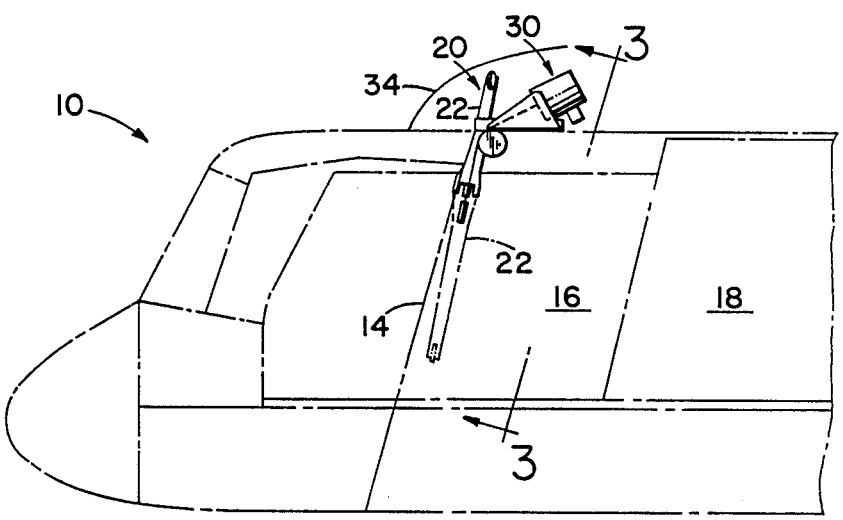
FIG. 2 is a fragmentary side view of the aircraft of FIG. 1, the boom of the hoist being shown by solid lines in its deployed condition and by broken lines in its retracted condition.

Referring now to the drawings, FIGS. 1 and 2 show a helicopter 10 equipped with a retractable boom hoist 20 embodying the present invention. The helicopter has a cockpit area 12 containing the pilot's seat and controls. A bulkhead 14 is a structural member of the helicopter 10 and is located aft of the cockpit area 12. A cabin doorway 16 and a sliding cabin door 18 are located aft of the bulkhead frame. The boom 22 of the hoist when retracted is located in a recess 23 (see FIG. 3) in the helicopter body occupying the space between the bulkhead 14 and the cabin doorway 16. Preferably, the sliding door 18 when closed also covers the recess 23 and the retracted boom 22.

Figure 3:
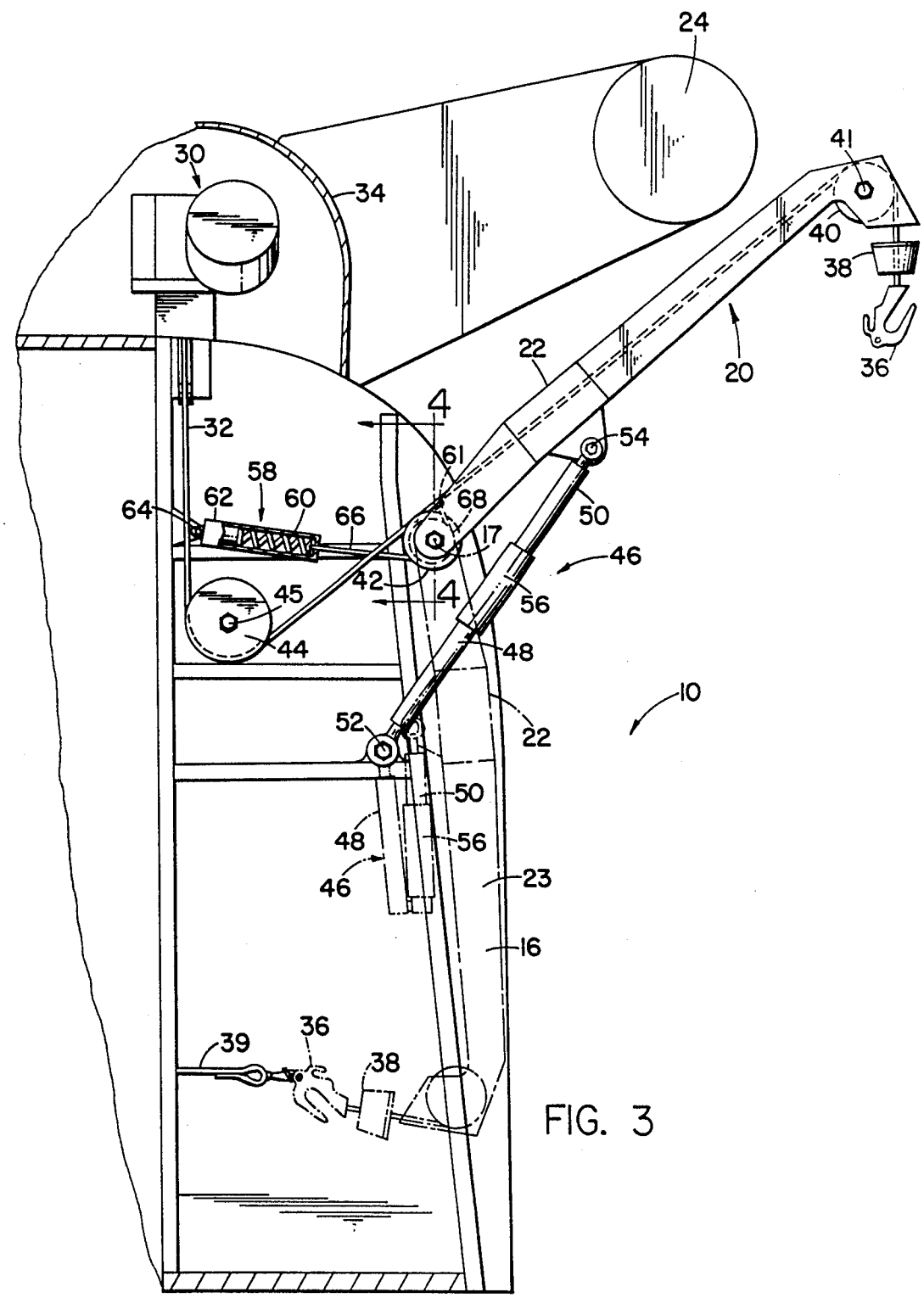
FIG. 3 is a partial sectional view taken along the line 3—3 of FIG. 2 illustrating in further detail the hoist embodying the present invention, the full lines showing the boom in its deployed condition and the broken lines showing the boom in its retracted condition.

The boom 22, as seen best in FIG. 3, is connected to a part of the structural frame 15 of the helicopter, which may also be part of the bulkhead 14, for pivotal movement about a generally horizontal fore and aft extending axis 17. Thus, the boom 22 can rotate between its retracted position and an extended or deployed position where it protrudes from the side of the helicopter, as shown by the solid lines of FIG. 3, when the hoist is needed for hoisting operations. When the boom 22 is in its deployed position it hangs high relative to the cabin doorway 16, which is an ideal arrangement for easily transferring a person or cargo suspended from the end of the boom to and from the cabin through the cabin doorway. As shown in FIG. 3 the boom 22 is also designed so that when deployed it clears and is out of line with an engine and engine fairing 24 which may also be located above the cabin doorway.

Figure 4:
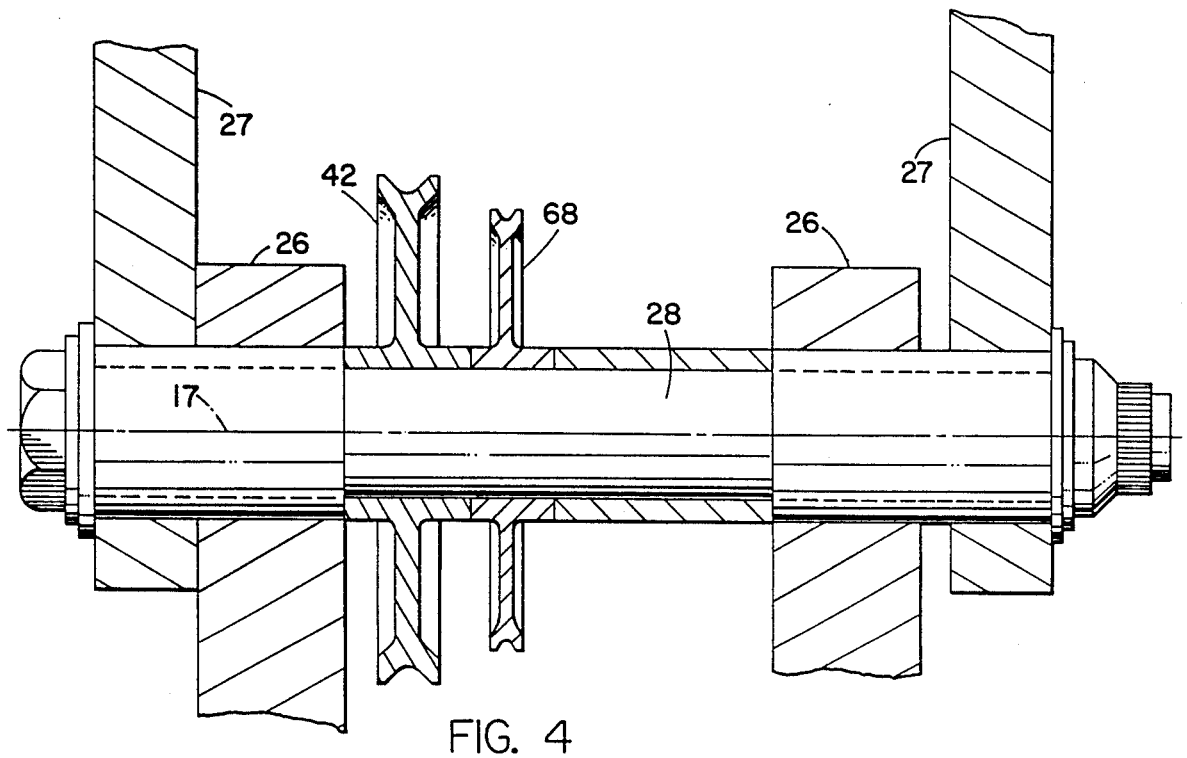
FIG. 4 is a sectional view taken along the line 4—4 of FIG. 3.

In FIG. 4 the mounting of the boom 22 to the frame structure 15 is shown in further detail. As illustrated, the frame 15 has two spaced walls 26 which are straddled by two side wall portions 27 of the boom. A shaft 28 is supported by and journaled for rotation relative to the walls 26. The boom side wall portions 27 also receive the shaft and are rotatable relative to it.

The hoist 20 includes a winch 30 which, as will be described in further detail below, is hydraulically powered and electrically controlled. The winch 30 is drivingly engaged with a cable 32 and operates to either pull in or pay out the cable from its body. The winch 30, preferably and as illustrated, is mounted above the cabin ceiling and is enclosed within a shroud 34, as shown in FIG. 3.

The cable 32 is associated with the boom 22 through three pulleys 40, 42 and 44. A hook 36 is attached to the free end of the cable 32 and a hook backup plate or stop 38 is fixed to the cable 32 immediately inboard of the hook. When the boom 22 is in its deployed position, the cable 32 which extends downwardly from the outer end of the boom 22 is used to raise or lower a person or cargo attached to the hook. When the boom 22 is in its retracted position the boom 22 may be held in place by attaching the hook 36 to a restraint cord 39.

At the outer end of the boom 22 the cable 32 passes over the first pulley 40 which is supported by a shaft 41 for rotation relative to the boom. The second pulley 42 is loosely mounted on the shaft 28 for rotation about the axis of the shaft. The third pulley 44 is supported by a shaft 45 for rotation relative to the supporting structure. The disadvantage of the three pulleys and the relative arrangement of their pivot axes is preferably such that when the boom is displayed, as seen in FIG. 3, the cable 32 passes directly from the pulley 44 to the pulley 40 and misses engagement with the pulley by about 1/16 inch or some other small distance so that the pulley 42 is not unnecessarily rotated during hoisting operations.

A foldable strut 46 is used to support the boom 22 against rotation about the shaft 28 when the boom is in its deployed position. The strut comprises two rods 48 and 50 which are pivotably connected to each other to form a folding joint at the middle portion of the strut. The other end of the rod 48 is pivotably connected to the frame structure 15 by a bolt 52, and the other end of the rod 50 is pivotably connected to the boom 22 by means of a bolt 54. A spring biased locking sleeve 56 slides under the influence of the spring bias over the folding joint connecting the rods 48 and 50 when the strut 46 is unfolded to lock the strut in the straight and rigid configuration shown by the solid lines of FIG. 3. At the beginning of a return of the boom from its deployed to its retracted position the strut rods 48 and 50 are unlocked from one another by manually pulling the locking sleeve 56 onto the rod 50 and beyond the folding joint to allow the rods 48 and 50 to be folded against one another. Foldable struts per se are known in the art, and the strut 46 may be any one of a variety of commercially available struts such as those sold by Avibank Manufacturing, Inc., of Burbank, Calif.

A significant feature of the invention is that the boom 22 is movable between its retracted and deployed positions by operation of the winch 30. As mentioned, in the retracted position the boom 22 may be held in place by a restraint cord 39 and, if so, before the boom 22 is extended the hook 36 is released from the cord 39. To thereafter extend the boom, the cable 32 is pulled in by the winch. This first causes the stop 38 on the cable to be drawn against the end of the boom 22. Further pulling in of the cable by the winch then causes the boom 22 to be pivoted toward the extended position. When the extended position is reached the strut 46 attains its unfolded or straight position and the spring biased locking sleeve 56 automatically slides over the folding joint between the rods 48 and 50 to lock the strut 46 in its straight configuration.

The hoist 20 also includes a means for spring biasing the boom towards its retracted position. Such spring biasing means may take various different forms and in the illustrated case includes a spring cartridge or bungee 58 containing a spring 60 housed within a cylindrical casing 62. The casing 62 is pivotally connected at one end by a bolt 64 to the frame structure 15. A cable 66, as shown in FIG. 3, extends from the cartridge 58 partially around a pulley 68 loosely mounted on the shaft 28, and has its free end fixed to the boom as indicated at 61 in FIG. 3. The action of the cartridge is to tend to draw the cable 66 into the casing 62 and to yieldingly resist its withdrawal. Accordingly it will be understood that the cable 66 and spring cartridge 58 yieldingly pull the boom toward the illustrated (broken line) retracted position shown in FIG. 3.

After the boom is extended as described in the preceeding paragraph the winch is operated to pay out as much of the cable 32 as needed for the following hoisting operations and during such operations the cable is paid out and drawn in by the winch as needed and in a conventional way.

After the hoisting operations are completed the boom 22 is retracted by first pulling in the cable until the stop 38 engages the boom and slightly lifts it to unload the strut 46, and by then unlocking the strut by manually sliding the locking sleeve 56 from the folding joint. The winch 30 is then operated to slowly pay out the cable 32 which allows the boom 22 to rotate to its retracted position under the biasing influence of gravity and of the spring cartridge or bungee 58.

Figure 5:
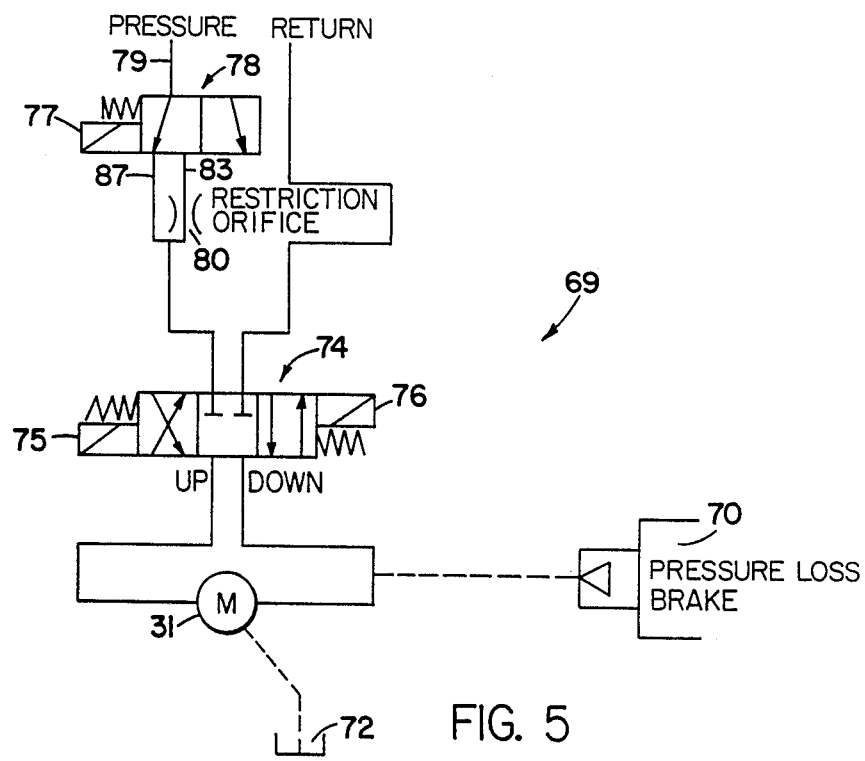
FIG. 5 is a schematic diagram illustrating the hydraulic control system associated with the winch of FIGS. 2 and 3.

The illustrated winch 30 is an hydraulically operated one having an associated hydraulic system 69 illustrated schematically in FIG. 5. Hydraulic winches are known in the art and the winch 30 may be any one of a variety of commercially available models, such as those sold by the Wadell Equipment Co., Inc., of Edison, N.J. As shown in FIG. 5 the hydraulic system includes a winch motor 31 forming part of the winch 30 and a pressure loss brake 70 which holds the motor 31 in a fixed position when the motor is shut off or if there is otherwise a loss of hydraulic fluid pressure to the motor. A case drain 72 receives hydraulic fluid which may leak from the motor 31.

The direction and speed of rotation of the winch motor 31 are controlled to pull in and pay out the cable 32. For this the hydraulic system 69 has a three-position solenoid actuated directional control valve 74 to control the supply and exhaust of hydraulic fluid to and from the motor.

When extending or retracting the boom 22 it is desirable to run the winch motor 31 below its normal speed. In the illustrated case the hoist 20 requires approximately 4 inches of movement of the cable 32 to rotate the boom between its extended and retracted positions, and under normal operation the winch pays out and pulls in the cable 32 at a speed of about 100 feet per minute. If this normal cable speed were used to move the boom 22 the extension and retraction time would be approximately 0.2 second, which would be far too rapid. To move the boom at a reasonable speed, the hydraulic system 69 therefore includes a two-way solenoid actuated valve 78 in the hydraulic fluid pressure or supply line 79. Downstream of the valve the supply line has two parallel legs 87 and 83 with the leg 83 containing a restriction 80. In the normal condition of the valve, shown in FIG. 5, the pressure fluid passes through the leg 87. During movement of the boom, however, the valve 78 is activated to shift its spool to the left, as seen in FIG. 5, to cause the pressure fluid to flow through the leg 83 and restriction 80 thereby reducing the speed of the winch motor 31.

Figure 6:
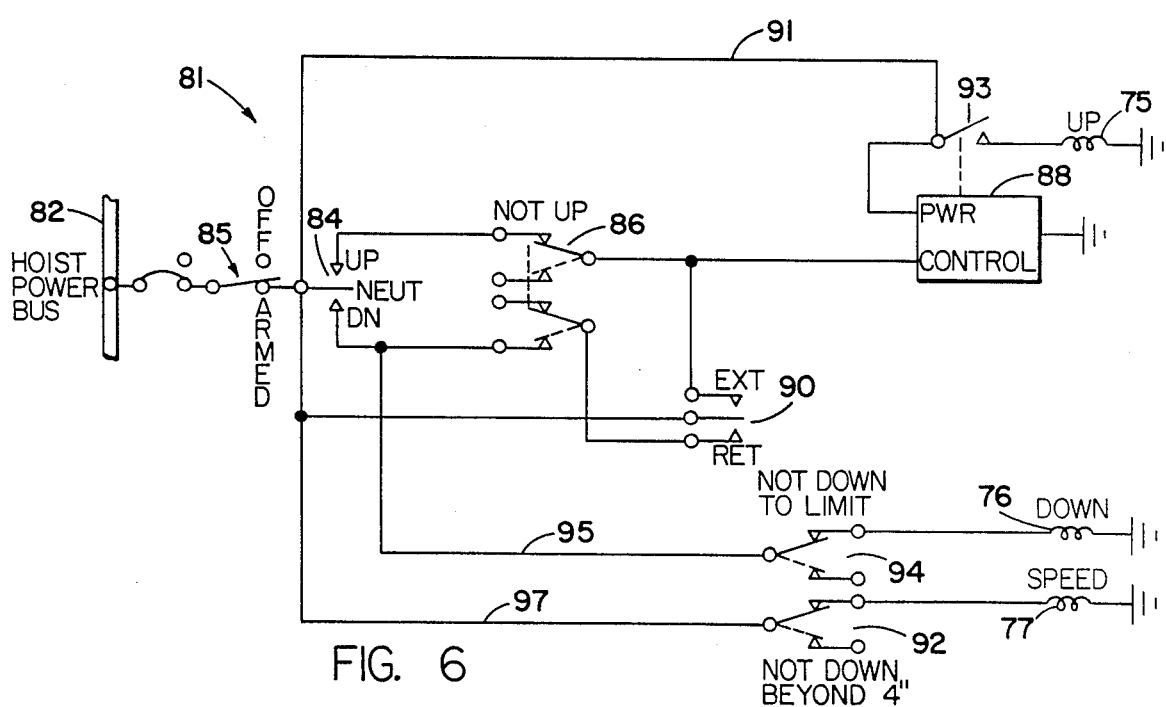
FIG. 6 is a schematic diagram illustrating the electric control system for the hoist of FIGS. 1 to 5.

The hydraulic system 69 is controlled by an electric control system 81 illustrated schematically in FIG. 6. The system 81 is connected to a power bus 82 through a two position arming switch 85 which permits an operator to either enable or disable the complete hoist system.

The electric control system 81 further includes a hoist control switch 84 selectively operable by the pilot from his cyclic stick grip, not shown, or by a crewmember from a cabin situated control station or grip, not shown. When the hoist system is armed by the switch 85 the hoist control switch 84 controls electric power to the solenoids 75 and 76 of the directional control valve 74. When the switch 84 is moved to the "up" position, the up solenoid 75 is energized to cause hydraulic fluid to flow through the winch motor 31 in such direction as to pull in the cable 32. When the switch 84 is moved to the "down" position, the "down" solenoid 76 is energized to cause the hydraulic fluid to flow through the motor in the opposite direction so as to pay out the cable 32.

Also included in the control system 81 is an "up limit" microswitch 86 located at the free end of the boom 22 and actuated by the stop 38 when the stop engages the outer end of the boom. In FIG. 6 this switch is shown in the position corresponding to the stop 38 being out of engagement with the boom, that is, the switch is in the position assumed during a hoisting operation. The up solenoid 75 is powered through a line 91 containing a switch 93 controlled by a time delay unit 88. The operation of the unit 88 is such that when it is energized it immediately closes the switch 93 and when it is deenergized it opens the switch 93 after a 0.5 second time delay. When the stop 38 engages the microswitch up limit switch 86 the switch is shifted to the broken line position shown in FIG. 6. Therefore, it will be understood that if the switch 84 is switched to the "up" condition when the cable stop 32 engages the boom, at that point the switch 86 will be shifted to its broken line or "cable up" position of FIG. 2 to deenergize the solenoid 75, through the time delay unit 88 and the switch 93, to terminate the upward or pulling in movement of the cable 32. However, because of the time delay interval provided by the unit 88 the upward movement of the cable will continue for 0.5 seconds after the switch 86 is operated. This assures that the cable stop will be moved into firm engagement with the outer end of the boom and will move it slightly upwardly or counterclockwise from the position shown in FIG. 3 to release the load on the folding strut 46 to permit it to be easily and safely unlocked by the operator.

The electric control system 81 also includes a "cable down" limit switch 94 and a speed control switch 92 both of which may be located on and be part of the winch 30. The cable down limit switch 94 is shown by the solid lines of FIG. 6 in the position corresponding to the cable 32 not being fully paid out of the winch. When the maximum amount of cable has been paid out of the winch the switch 94 shifts to the broken line position. Power to the "down" solenoid 76 is supplied by the line 95 through the hoist control switch 84, and the down limit switch 94. Therefore it will be understood from FIG. 6 that when the down limit of the cable is reached, as a result of the maximum available amount of the cable having been paid out from the winch, the switch 94 will open the circuit to the down solenoid 76 to prevent the winch motor 31 from being further energized in the down direction.

The speed control switch 92 is in the line 97 which powers the speed control solenoid 77. This switch 92 is in the position illustrated by the full lines of FIG. 6 throughout the 4 inch range of pulling in or paying out motion of the cable 32 which occurs during retraction or extension of the boom. When the paid out condition of the cable moves beyond this range the switch 92 shifts to the broken line position of FIG. 6. Therefore, from FIG. 6 it will be understood that during the retraction or extension movement of the boom the speed control solenoid 77 is energized to cause speed control valve 78 to supply pressure fluid to the winch motor through the restriction 80 of FIG. 5 to cause operation of the winch motor at a slow speed.

Finally, the control system 81 of FIG. 6 also includes a boom control switch 90 which is actuatable by the operator to cause extension or retraction of the boom 22. During the extension or retraction of the boom the stop 38 engages the switch 86 and therefore holds it in the broken line position of FIG. 6. With this in mind, it will therefore be understood that moving the boom control switch 90 to the extend position will energize the up solenoid 75 to cause powering of the winch 30 to move the boom in the extending direction, and that movement of the switch 90 to the retract position will energize the "down" solenoid 76 to power the winch motor in the boom retracting direction.

Having in the foregoing fully described the construction of the hoist 20 and of its hydraulic and electric control systems, its operation may now be described as follows.

Assuming that the boom is initially in its stowed or retracted condition, and that the arming switch 85 is in its armed condition, an operator actuates the boom control switch 90 to the "extend" position. This energizes the "up" solenoid 75, as a result of the switch 93 being immediately closed by the time delay unit 88, and causes the winch motor 31 to be driven in such a direction as to pull in the cable 32. This pulling in of the cable causes the boom to be swung counterclockwise in FIG. 3 from its retracted to its extended position. During this extending movement the cable is so positioned relative to the winch that the speed control switch 92 is closed to energize the speed solenoid 77 and thereby to bring the restriction 80 into play causing the winch motor 31 to operate at a slow speed. This, as mentioned, causes the extending movement of the boom to occur at a reasonable and safe speed. When the boom reaches its extended position the folding strut 46 automatically shifts to its locked position and the boom control switch 90 is released by the operator. The boom is then ready for use in a conventional way for hoisting operations and the cable is raised and lowered by the operator through the use of the hoist control switch 84.

When the hoisting operations are over the operator switches the hoist control switch 84 to the "up" condition until the stop 38 is brought into contact with the outer end of the boom. When this occurs the "up" limit switch 86 is operated and causes the "up" solenoid 75 to be deenergized after a 0.5 second delay, as a result of which the boom is raised slightly from its normal extended position to unload the folding strut 46. The operator then manually unlocks the folding strut 46 by sliding the locking sleeve 56 outwardly or onto the rod 50 and at the same time shifts the boom control switch 90 to the "retract" position. As the stop 38 approaches the outer end of the boom the position of the cable 32 relative to the winch moves to within the range at which the low speed switch 92 is closed causing the winch motor 31 to be operated at slow speed. Accordingly, the stop 38 is brought into actual contact with the boom at such slow speed.

When the boom control switch 90 is shifted to the "retract" position the down solenoid 76 is energized to cause the winch to pay out cable allowing the boom to move from its extended to the retracted position with such movement being urged by the weight of the boom and the biasing effect of the spring cartridge 58. Also, at this time the speed switch 92 is closed to cause the winch to be operated at a slow speed thereby assuring that the boom reaches its final retracted position safely and without impact on adjacent parts. Once in its fully retracted position the boom may be further held in such position by attaching the restraining cord 39 to the hook 36 as shown in FIG. 3.

We claim:

1. A hoist for an aircraft having a frame structure, said hoist comprising:

a boom connected to the said frame structure for rotation relative to said frame structure about a pivot axis between a retracted and an extended position, said boom having an outer end spaced from said pivot axis, a cable having an outer end, a winch carried by said frame structure and connected with said cable and operable to pay out or pull in said cable to vary the length of said cable existing between said winch and said outer end of said cable, a guide means restraining said cable to movement over a point on said outer end of said boom, at least one pulley between said winch and said outer end of said boom for guiding said cable from said winch to said guide means on said outer end of said boom, a stop on said outer end of said cable movable into engagement with said outer end of said boom as said cable is pulled in by said winch, means for biasing said boom toward said retracted position, and means for releasably holding said boom in said extended position, said first pulley being so arranged relative to said pivot axis and to the positions assumed by said outer end of said boom when the boom is in its retracted and extended positions that with said stop in engagement with said outer end of said boom said cable may be used to pull said boom from its retracted to its extended position against the force of said biasing means by using said winch to pull in said cable and may be used to control movement of said boom from its extended position to its retracted position under the force of said biasing means by using said winch to pay out said cable, and said winch when said boom is in its extended position being usable to pay out and pull in said cable for a normal hoisting operation involving the raising and/or lowering of an object connected to said outer end of said cable.

2. A hoist as defined in claim 1 further characterized by said means for releasably holding said boom in its extended position being a foldable strut having one end pivotally connected to said boom and another end pivotally connected to said structural frame, said foldable strut further including two elongated members joined to one another by a hinge joint, and a sleeve movable into and out of locking relationship with respect to said two members, said sleeve in its locked condition holding said two members in an unfolded condition in which they are substantially in line with one another and said sleeve in its unlocked condition permitting said two members to rotate relative to one another about said hinge joint to move between said unfolded in line condition to a folded condition.

3. A hoist as defined in claim 1 further characterized by a control means associated with said winch for causing said winch to pay out and pull in said cable at one speed during a hoisting operation and to pull in and pay out said cable at a slower speed during movement of said boom between its retracted and extended positions.

4. A hoist as defined in claim 1 further characterized by an intermediate pulley supported for rotation about said pivot axis of said boom, said restraining means on said outer end of said boom, said first pulley and said intermediate pulley being so related that said cable passes over said intermediate pulley during the major portion of the movement of said boom between its retracted and extended positions and so that said cable moves out of engagement with said intermediate pulley when said boom is at or near its extended position.

5. A hoist as defined in claim 1 further characterized by said aircraft being a helicopter having a forward cockpit area and a cabin area aft of said cockpit area and a doorway on one side of said body providing access to said cabin area, said boom pivot axis being a substantially horizontal axis extending fore and aft relative to said helicopter body, said pivot axis of said boom further being located near the ceiling of said cabin area and said boom being located between said cockpit area and said doorway on the side of said body containing said doorway with said boom in its retracted position fitting into a generally vertically extending recess in said helicopter body and in its extended position extending outwardly from said helicopter body.

6. A hoist as defined in claim 5 further characterized by said helicopter body including a sliding door for said cabin doorway, said sliding doorway having a closed position at which it closes both said cabin doorway and said boom recess and an open position at which both said cabin doorway and said boom recess are uncovered.

7. A hoist as defined in claim 1 further characterized by said means for biasing said boom toward its extended position comprising a biasing cable having one end fixed to said boom, a spring means, a means connecting said spring means between said frame structure and said cable, and means for guiding said cable to said boom so that said spring means through said cable urges said boom to its retracted position and yieldingly resists movement of said boom from its retracted position to its extended position.

8. A hoist as defined in claim 7 further characterized by said means for guiding said biasing cable to said boom including a pulley supported for rotation about said pivot axis of said boom and over which said biasing cable passes as said boom is moved between its retracted and extended positions.

9. A hoist as defined in claim 1 further characterized by a switch on said outer end of said boom engageable with said stop on said outer end of said cable as said cable is pulled in by said winch, a control system for said winch which control system includes an up switch which when actuated causes operation of said winch to pull in said cable, and means associated with said switch on the outer end of said boom for terminating the pulling in movement of said cable by said winch after the running of a predetermined time delay period after the operation of said switch on the outer end of said boom.

* * * * *